2,640,713

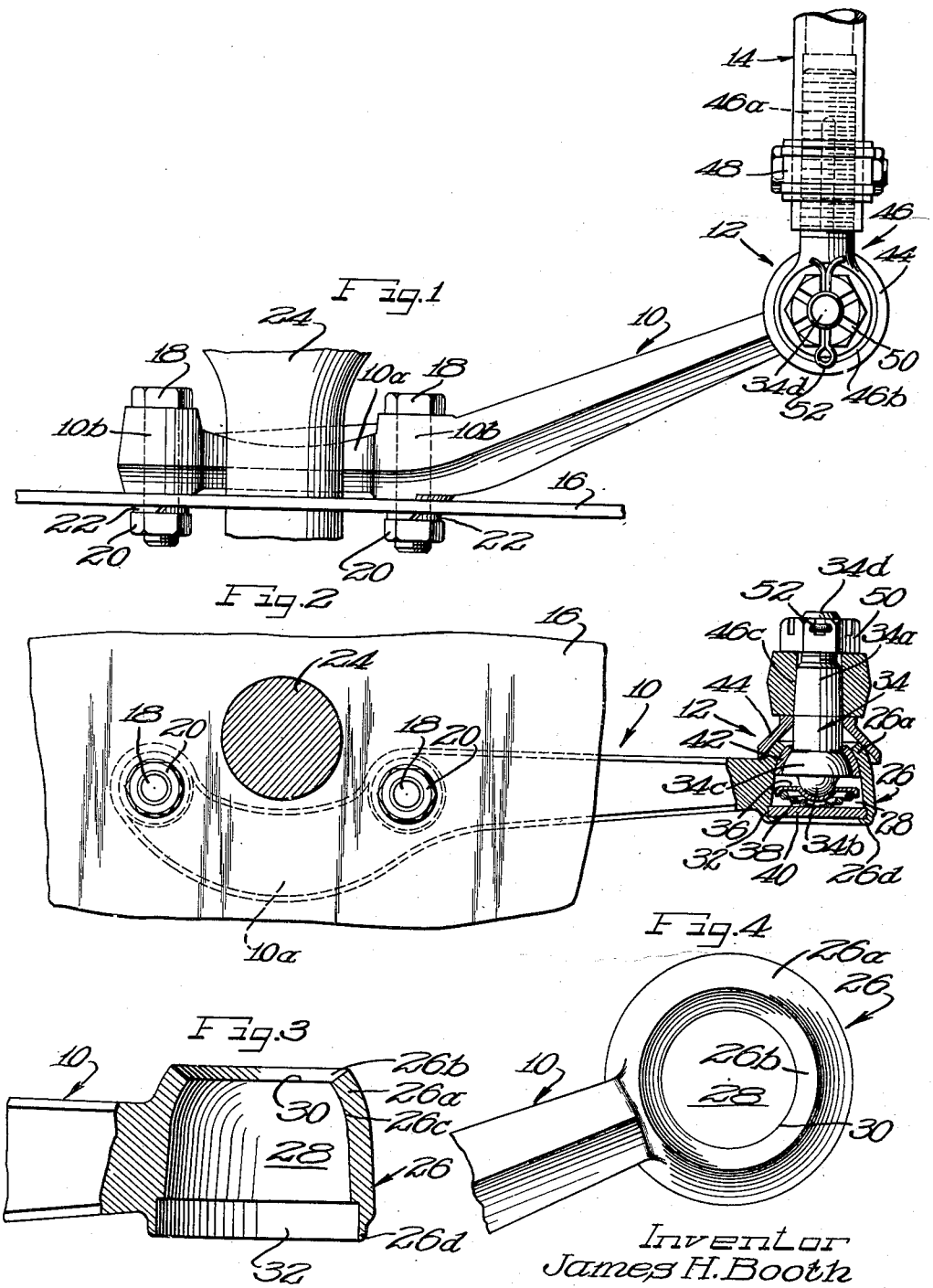
June 2, 1953 — J. H. BOOTH — 2,640,713
STEERING ARM AND BALL JOINT ASSEMBLY
Filed Aug. 6, 1949
Inventor
James H. Booth Patented June 2, 1953

UNITED STATES PATENT OFFICE 2,640,713

STEERING ARM AND BALL JOINT ASSEMBLY

James H. Booth, Venice Township, Shiawassee County, Mich., assignor to Thompson Products, Inc., Cleveland, Ohio, a corporation of Ohio Application August 6, 1949, Serial No. 108,879

1 Claim. (Cl. 280—95)

This invention relates to an arm having a universal joint assembly and relates particularly to a ball joint equipped steering arm for direct connection with an adjustable link in an automotive steering linkage.

In the past, ball joints for interconnecting the linkage members of automotive steering assemblies have included housings with stems or shanks that were adjustably threaded to the ends of the rods or the like steering linkage members. The ball members of such joints have shanks with tapered portions that are wedge fitted into the eye ends of coacting link members such as the steering arms. Such ball joints are commonly called "tie rod joints" or "tie rod ends."

Since steering arms and tie rod joint housings are forgings it is a feature of this invention to lower manufacturing costs, without sacrificing efficiency or adjustability, by forging the joint housing and steering arm as a single unit adapted for direct mounting on the backing plate of the wheel spindle. The stud of the ball joint carried by the arm is then secured in an inexpensive eyebolt carried by the tie rod. This eye-bolt is preferably cold pressed and may be economically and simply manufactured. It should therefore be obvious that the jointed linkage of this invention may be more economically fabricated than any heretofore known without sacrificing efficiency or functional qualities.

Accordingly, it is an object of this invention to provide an improved tie rod assembly.

Another object of this invention is to provide an automotive wheel steering arm carrying its own tie rod joint and arranged for direct mounting on a backing plate of a wheel spindle.

A further object of this invention is to provide a single forging performing the dual function of a steering arm and a tie rod joint housing in an automotive steering linkage.

A specific object of the invention is to provide a steering linkage with a combined wheel arm and joint housing connected to a tie rod through an adjustable eye bolt.

Other and further objects of the present invention will become apparent to those skilled in the art from the following detailed description of the annexed sheet of drawings which, by way of preferred example only, illustrate one specific embodiment of this invention installed in a steering control unit for automotive vehicles.

As shown on the drawings:

Figure 1 is a top plan view of the steering arm of this invention and illustrating the manner in which the arm is adjustably connected to a tie rod or the like link in accordance with this invention;

Figure 2 is a side elevational view, with parts in vertical cross-section, of the steering arm and wheel mounting therefor;

Figure 3 is an enlarged view of the joint housing end of the steering arm, the housing being shown in vertical cross-section; and Figure 4 is a top plan view of the steering arm showing the integrally formed forged joint housing.

As shown on the drawings:

In Figure 1 and the other figures of the drawings, the reference numeral 10 indicates generally the steering arm for a steerable wheel (not shown) of an automotive vehicle. Reference numeral 12 indicates generally a joint assembly incorporating the features of this invention and which connects the arm 10 to a tie rod 14 of the vehicle's steering linkage.

The arm 10 is a forged piece and has an arcuate portion 10a (Figure 2) adjacent a brake drum backing plate 16 to which it is secured. Apertured boss portions 10b are disposed at each end of the arcuate portion 10a. The boss portions 10b receive bolts 18 therethrough which pass through the backing plate 16 and are secured by the nuts 20 and lock washers 22. The wheel spindle 24 passes through the brake drum backing plate 16 adjacent and partially within the curvature of the arcuate portion 10a of the arm 10. Since the brake drum (not shown) is attached to the wheel, it is obvious that movement of the tie rod 14 causing movement of the steering arm 10 will also cause controlled longitudinal turning of the wheel, the function of the steering control linkage.

The controlled movement of the arm 10 is imparted thereto by the tie rod 14 through the ball joint 12. The ball joint 12 comprises a housing or socket 26 which is integrally forged in the end of the arm 10. As is best seen with reference to Figure 3, the housing or socket 26 has a central bore 28 terminating in a top end opening 30 and in a countersunk opening 32 at the bottom. The top portion 26a of the housing 26 is of segmental spherical contour terminating in a tapered upper edge 26b which defines the upper opening 30. The inner surface 26c of the portion 26a is machined to present a segmental spherical bearing surface adjacent the end opening 30.

A stud element 34, having a tapered shank portion 34a and a segmental ball head portion 34b is disposed with its head 34b within the housing 26 for bearing support therein and with the shank 34a projecting through and above the top end opening 30 in the housing 26. The head 34b of the stud 34 is seated in a freely disposed seating element 36 which is urged by the spring 38 upwardly to maintain seating contact with the head 34b. The spring 38 rests against an end closure member 40 which is retained in the countersink 32 by peening or inwardly spinning the lower extremity 26d of the housing 26 after placing the closure member 40 at the bottom of the countersink. The stud 34 has a segmental spherical shoulder 34c adjacent and above the head 34b, which is embraced by a cup-shaped bearing member 42 which has a central aperture through which the shank of the stud 34 extends. The bearing member 42 will move with the stud 34 during tilting movement thereof and bears against the segmental spherical surface 26b of the housing or socket 26. This bearing contact is maintained due to the resilient urging of the spring 38 against the seat element 36 and the bearing head 34b.

The stud and housing member as completely assembled is covered by a dust cap 44 which embraces the outer segmental spherical surface of the portion 26a of the housing 26 and which also embraces the straight portion of the shank of the stud 34. The dust cap 44 seals the stud and housing assembly from the entry of dust and water.

As previously mentioned, the tie rod 14 is connected to the stud element of the joint assembly, this connection being simplified by the adaptation of an eye-bolt 46 which has a threaded end portion 46a which is threaded within the split end of the tie rod 14 for adjustment and clamped thereon by the clamp 48 (Figure 1). The eye portion 46b of the eye-bolt 46 has a tapered aperture 46c which snugly fits over the tapered shank portion 34a of the stud 34 adjacent and above the dust cap 44.

The stud 34 has a threaded end portion 34d which extends through the eye 46b and receives thereon a nut 50 for wedging the eye on the tapered stud shank. The nut 50 is secured against loosening movement by a cotter key 52 passed through a suitable aperture in the threaded end portion 34c of the stud and through suitable top grooves in the nut 50.

From the foregoing description it should be clear that a unitary forged steering arm and ball joint housing has been provided to be easily secured to a wheel spindle assembly at one end and to carry a ball joint stud at the other end for connection to an adjustable forged or cold pressed eye-bolt on a link rod.

It will be equally apparent that modifications and variations may be effected without departing from the scope of the novel concepts of the present invention.

I claim as my invention:

In a steering control mechanism for automotive vehicles and the like, the improvement comprising an elongated steering arm having an offset arcuate end adapted to span a wheel spindle, said end portion having apertured bosses adapted to receive mounting bolts for connecting the arm to a brake drum backing plate, said arm having a housing at the other end thereof, said housing having a central bore with an open top end and an open countersunk bottom and said housing adjacent the upper end thereof having a segmental spherical contour surrounding said open top end of the bore, a closure element disposed within said countersunk opening and fixedly secured therein, a seating element for a stud member disposed within said housing, resilient means interposed between said seating element and said closure element and constantly biasing said seating element away from said closure element, a stud member having a tapered shank at the upper end thereof and a segmental ball head portion at the lower end thereof and nested in said seating element, said stud having a segmental spherical shoulder adjacent the lower end thereof, a segmental spherical bearing member embracing said shoulder and having an exterior contour complementing said segmental spherical contour of said housing and bearing thereagainst, an exposed dust cap having its lower end embracing and resting on the outer segmental spherical portion of said housing and embracing a portion of said stud member, said dust cap projecting upwardly away from said housing, an eye-bolt having a tapered portion to receive said tapered portion of said stud member, said eye-bolt having its lower end abutting against the upper end of said dust cap, said eye-bolt having a threaded end for adjustable connection with a tie rod of said vehicle, said stud having a threaded end portion projecting above said eye-bolt, and a nut on said threaded end securing the assembled elements in their relative positions.

JAMES H. BOOTH.

References Cited in the file of this patent

UNITED STATES PATENTS

| Number | Name | Date |
|---|---|---|
| 1,959,563 | Baker | May 22, 1934 |
| 2,129,804 | Wheat | Sept. 13, 1938 |
| 2,383,378 | Flumerfelt | Aug. 21, 1945 |
| 2,390,231 | Utz | Dec. 4, 1945 |
| 2,397,464 | Booth | Apr. 2, 1946 |
| 2,449,306 | Leighton | Sept. 14, 1948 |
| 2,461,775 | Roos | Feb. 15, 1949 |
| 2,464,982 | Leighton | Mar. 22, 1949 |
| 2,495,959 | Flumerfelt | Jan. 31, 1950 |
| 2,496,839 | Abramoska | Feb. 7, 1950 |
| 2,545,119 | Stratton et al. | Mar. 13, 1951 |

FOREIGN PATENTS

| Number | Country | Date |
|---|---|---|
| 889,715 | France | Oct. 11, 1943 |